(12) United States Patent
Wang et al.

(10) Patent No.: US 11,342,779 B2
(45) Date of Patent: May 24, 2022

(54) WIRELESS CHARGING APPARATUS AND CONTROL METHOD AND CONTROL DEVICE THEREFOR

(71) Applicant: BEIJING XIAOMI MOBILE SOFTWARE CO., LTD., Beijing (CN)

(72) Inventors: Yanteng Wang, Beijing (CN); Zhijie Li, Beijing (CN); Chunli Xu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 122 days.

(21) Appl. No.: 16/586,974

(22) Filed: Sep. 28, 2019

(65) Prior Publication Data
US 2020/0177013 A1    Jun. 4, 2020

(30) Foreign Application Priority Data
Nov. 30, 2018   (CN) .......................... 201811455820.4

(51) Int. Cl.
| H02J 7/00 | (2006.01) |
|---|---|
| H02J 7/02 | (2016.01) |
| H02J 50/12 | (2016.01) |

(52) U.S. Cl.
CPC .............. H02J 7/025 (2013.01); H02J 50/12 (2016.02)

(58) Field of Classification Search
USPC .................................................. 320/106–115
See application file for complete search history.

(56) References Cited

U.S. PATENT DOCUMENTS

| 9,887,030 B2* | 2/2018 | Lee ....................... H01F 7/0231 |
|---|---|---|
| 2013/0062961 A1 | 3/2013 | Park et al. |
| 2013/0200717 A1 | 8/2013 | Bourilkov et al. |
| 2014/0015331 A1* | 1/2014 | Kim ....................... H02J 50/80 307/104 |
| 2014/0346888 A1* | 11/2014 | Kim ....................... H02J 50/12 307/104 |
| 2015/0213933 A1 | 7/2015 | Lee et al. |
| 2016/0118845 A1* | 4/2016 | Yeo ....................... H02J 7/0013 320/108 |
| 2017/0305280 A1 | 10/2017 | Weidner et al. |
| 2018/0342897 A1 | 11/2018 | Huang et al. |

FOREIGN PATENT DOCUMENTS

| CN | 102035268 A | 4/2011 |
|---|---|---|
| CN | 103427499 A | 12/2013 |
| CN | 106104963 A | 11/2016 |

(Continued)

OTHER PUBLICATIONS

International search report of PCT application No. PCT/CN2019/090408 dated Sep. 4, 2019.
Extended European search report INEP application No. 10200487.7 dated Jan. 16, 2020.
Russian Office Action in Application No. 2019134236/07(067544) dated Feb. 26, 2020.

(Continued)

*Primary Examiner* — Binh C Tat
(74) *Attorney, Agent, or Firm* — Syncoda LLC; Feng Ma (57) ABSTRACT

A control method for a wireless charging apparatus includes: receiving a power adjustment value transmitted by a terminal; and adjusting at least one of an output voltage or an output frequency of a wireless Alternating Current (AC) power signal according to the power adjustment value to adjust an output power of the wireless AC power signal.

16 Claims, 3 Drawing Sheets

(56) References Cited

FOREIGN PATENT DOCUMENTS

| | | |
|---|---|---|
| CN | 106451705 A | 2/2017 |
| CN | 106532989 A | 3/2017 |
| CN | 107482710 A | 12/2017 |
| CN | 107623344 A | 1/2018 |
| CN | 107968492 A | 4/2018 |
| CN | 108649716 A | 10/2018 |
| EP | 3203606 A1 | 8/2017 |
| JP | 2017175803 A | 9/2017 |
| JP | 2018064333 A | 4/2018 |
| JP | 20180148638 A | 9/2018 |
| JP | 2018170905 A | 11/2018 |
| RU | 2594175 C1 | 8/2016 |
| WO | 2018179337 A1 | 10/2018 |
| WO | 20180184583 A1 | 10/2018 |

OTHER PUBLICATIONS

International Search Report in Application No. PCT/CN2019/090408, dated Jun. 4, 2020.
KR Office Action in Application No. 10-2019-7023236, dated Jun. 22, 2020.
CN First Office Action in Application No. 201811455820.4, dated Jan. 20, 2021.
Japan First Office Action in Application No. 2019-542082, dated Apr. 1, 2021.
Japan Notice of Allowance for Application No. 2019-542082, dated Nov. 30, 2021.
QI System Description Wireless Power Transfer, vol. I: Low Power, Part 1: Interface Definition Version 1.0.1, Oct. 2010, Wireless Power Consortium.

* cited by examiner

WIRELESS CHARGING APPARATUS AND CONTROL METHOD AND CONTROL DEVICE THEREFOR

CROSS-REFERENCE TO RELATED APPLICATIONS

This application claims priority to Chinese Patent Application No. 201811455820.4 filed Nov. 30, 2018, the entire contents of which are incorporated herein by reference.

BACKGROUND

With the continuous development of wireless charging technologies, more and more terminal devices, such as wearable devices and mobile smart terminals, are capable of being charged wirelessly.

SUMMARY

The present disclosure relates generally to the field of wireless charging technologies, and more specifically to a control method and a control device for a wireless charging apparatus, and a wireless charging apparatus.

Various embodiments of the present disclosure provide a control method and a control device for a wireless charging apparatus, and a wireless charging apparatus.

According to a first aspect of the embodiments of the present disclosure, there is provided a control method for a wireless charging apparatus, applied to a wireless charging apparatus that converts a Direct Current (DC) power signal provided by a charger into a wireless AC power signal to wirelessly charge a terminal, the method including:

receiving a power adjustment value transmitted by a terminal, the power adjustment value indicating a difference between a real voltage of the wireless Alternating Current (AC) power signal received by the terminal and a target voltage; and adjusting at least one of an output voltage or an output frequency of the wireless AC power signal according to the power adjustment value to adjust an output power of the wireless AC power signal.

For the method above, in some embodiments, the adjusting at least one of the output voltage or the output frequency of the wireless AC power signal according to the power adjustment value to adjust the output power of the wireless AC power signal includes:

when the power adjustment value indicates that the real voltage is less than the target voltage, adjusting at least one of the output voltage or the output frequency of the wireless AC power signal according to the power adjustment value to improve the output power of the wireless AC power signal; and when the power adjustment value indicates that the real voltage is greater than the target voltage, adjusting at least one of the output voltage or the output frequency of the wireless AC power signal according to the power adjustment value to reduce the output power of the wireless AC power signal.

For the method above, in some embodiments, the adjusting at least one of the output voltage or the output frequency of the wireless AC power signal according to the power adjustment value includes at least one of followings:

when the power adjustment value indicates that the real voltage is less than the target voltage, and the output voltage of the wireless AC power signal is less than a voltage limit, improving the output voltage of the wireless AC power signal;

when the power adjustment value indicates that the real voltage is less than the target voltage, and the output voltage of the wireless AC power signal is equal to the voltage limit, reducing the output frequency of the wireless AC power signal;

when the power adjustment value indicates that the real voltage is greater than the target voltage, and the output frequency of the wireless AC power signal is less than a frequency limit, improving the output frequency of the wireless AC power signal; and when the power adjustment value indicates that the real voltage is greater than the target voltage, and the output frequency of the wireless AC power signal is equal to the frequency limit, reducing the output voltage of the wireless AC power signal.

For the method above, in some embodiments, the power adjustment value is represented by the following Equation 1, $$CEP_{value} = \frac{V_{target} - V_{rect}}{V_{target}} \times a \qquad \text{Equation 1}$$

wherein $CEP_{value}$ is the power adjustment value, $V_{target}$ is the target voltage of the wireless AC power signal received by the terminal, $V_{rect}$ is the real voltage of the wireless AC power signal received by the terminal, and a is an adjustment coefficient.

For the method above, in some embodiments, the method further includes:

when the wireless charging apparatus does not include a buck converter circuit, determining a type of a charger connected to the wireless charging apparatus; and when the charger with the determined type does not have a voltage adjustment function, adjusting at least one of the output frequency or a duty ratio of the wireless AC power signal according to the power adjustment value to adjust the output power of the wireless AC power signal.

According to a second aspect of the embodiments of the present disclosure, there is provided a control device for a wireless charging apparatus, applied to a wireless charging apparatus that converts a DC power signal provided by a charger into a wireless AC power signal to wirelessly charge a terminal, the device including:

an adjustment value receiving module configured to receive a power adjustment value transmitted by a terminal, the power adjustment value indicating a difference between a real voltage of the wireless AC power signal received by the terminal and a target voltage; and a first control module configured to adjust at least one of the output voltage or the output frequency of the wireless AC power signal according to the power adjustment value to adjust the output power of the wireless AC power signal.

For the device above, in some embodiments, the first control module includes:

a power improving submodule configured to, when the power adjustment value indicates that the real voltage is less than the target voltage, adjust at least one of the output voltage or the output frequency of the wireless AC power signal according to the power adjustment value to improve the output power of the wireless AC power signal; and a power reducing submodule configured to, when the power adjustment value indicates that the real voltage is greater than the target voltage, adjust at least one of the output voltage or the output frequency of the wireless AC power signal according to the power adjustment value to reduce the output power of the wireless AC power signal.

For the device above, in some embodiments, the first control module includes at least one of following submodules:

a voltage improving submodule configured to, when the power adjustment value indicates that the real voltage is less than the target voltage, and the output voltage of the wireless AC power signal is less than a voltage limit, improve the output voltage of the wireless AC power signal;

a frequency reducing submodule configured to, when the power adjustment value indicates that the real voltage is less than the target voltage, and the output voltage of the wireless AC power signal is equal to the voltage limit, reduce the output frequency of the wireless AC power signal;

a frequency improving submodule configured to, when the power adjustment value indicates that the real voltage is greater than the target voltage, and the output frequency of the wireless AC power signal is less than a frequency limit, improve the output frequency of the wireless AC power signal; and a voltage reducing submodule configured to, when the power adjustment value indicates that the real voltage is greater than the target voltage, and the output frequency of the wireless AC power signal is equal to the frequency limit, reduce the output voltage of the wireless AC power signal.

For the device above, in some embodiments, the power adjustment value is represented by Equation 1, $$CEP_{value} = \frac{V_{target} - V_{rect}}{V_{target}} \times a \qquad \text{Equation 1}$$

wherein $CEP_{value}$ is the power adjustment value, $V_{target}$ is the target voltage of the wireless AC power signal received by the terminal, $V_{rect}$ is the real voltage of the wireless AC power signal received by the terminal, and a is an adjustment coefficient.

For the device above, in some embodiments, the device further includes:

a type determination module configured to, when the wireless charging apparatus does not include a buck converter circuit, determine a type of a charger connected to the wireless charging apparatus; and a second control module configured to, when the charger with the determined type does not have a voltage adjustment function, adjust at least one of the output frequency or a duty ratio of the wireless AC power signal according to the power adjustment value to adjust the output power of the wireless AC power signal.

It should be understood that the foregoing general description and the following detailed description are exemplary and explanatory only, and cannot limit the present disclosure.

BRIEF DESCRIPTION OF THE DRAWINGS

The accompanying drawings herein are incorporated in and constitute a part of this description, illustrate the embodiments in conformity with the disclosure, and serve to explain the principles of the disclosure together with the description.

DETAILED DESCRIPTION

Reference will be now made in detail to exemplary embodiments, examples of which are illustrated in the accompanying drawings. When the following description refers to the drawings, the same numbers in different drawings indicate the same or similar elements unless otherwise indicated. The implementations set forth in the following description of exemplary embodiments do not represent all the implementations consistent with the invention. On the contrary, they are merely examples of devices and methods consistent with some aspects of the disclosure as detailed in the appended claims.

Figure 1:
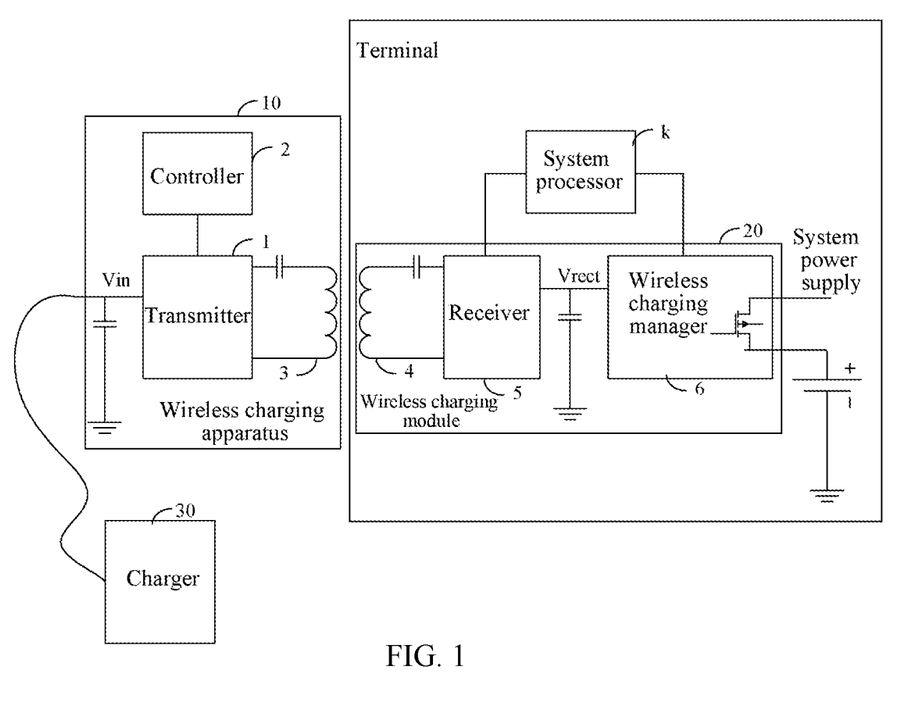
FIG. 1 is a wireless charging system according to an exemplary embodiment.

FIG. 1 is a wireless charging system according to an exemplary embodiment. As shown in FIG. 1, the wireless charging system includes a wireless charging apparatus 10 and a wireless charging module 20 disposed in a terminal. The wireless charging apparatus 10 may include a transmitter 1, a controller 2, and a transmitting coil 3. The wireless charging module 20 may include a receiving coil 4, a receiver 5, and a wireless charging manager 6. The receiver 5 and the wireless charging manager 6 in the wireless charging module 20 are connected to a system processor k of the terminal, acquire charging information required for charging a battery of the terminal from the system processor k, and configure based on configuration information transmitted by the system processor k, etc.

The various device components, units, blocks, or portions may have modular configurations, or are composed of discrete components, but nonetheless can be referred to as "modules" in general. In other words, the "components," "portions," "modules" or "units" referred to herein may or may not be in modular forms.

The transmitter 1 is connected to the charger 30, receives a DC power signal provided by the charger 30, and converts the DC power signal into a wireless AC power signal under the control of the controller 2, and transmits the wireless AC power signal through the transmitting coil 3. The receiving coil 4 receives the wireless AC power signal transmitted from the transmitting coil 3 and transmits the wireless AC power signal to the receiver 5. The receiver 5 converts the wireless AC power signal into a DC charging power signal required for charging the battery of the terminal under the control of the wireless charging manager 6. The wireless charging manager 6 charges the battery of the terminal based on the DC charging power signal and powers the system for the terminal.

The transmitter 1 may include a full-bridge inverter circuit or a half-bridge inverter circuit for converting the DC power signal into the required wireless AC power signal. The receiver 5 may include a rectifying circuit for converting the wireless AC power signal into the required DC charging power signal, and a modulation-demodulation circuit for modulating and demodulating the signal.

Figure 2:
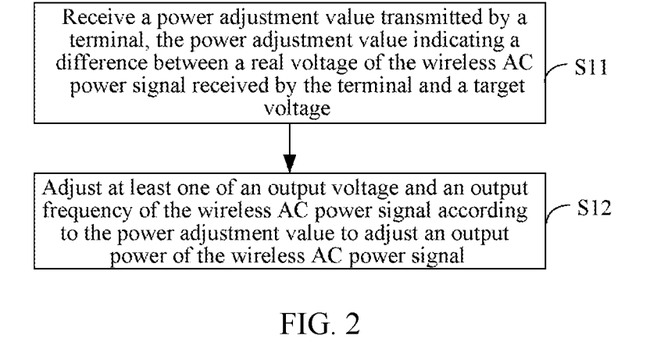
FIG. 2 is a flowchart of a control method for a wireless charging apparatus according to an exemplary embodiment.

FIG. 2 is a flowchart of a control method for a wireless charging apparatus according to an exemplary embodiment.

The method may be applied to the wireless charging apparatus as shown in FIG. 1, for example, the method may be executed by the controller 2, and the wireless charging apparatus converts the DC power signal provided by the charger into a wireless AC power signal to wirelessly charge the terminal. As shown in FIG. 2, the method includes a step S11 and a step S12.

In the step S11, a power adjustment value transmitted by a terminal is received, the power adjustment value indicating a difference between a real voltage of the wireless AC power signal received by the terminal and a target voltage. The terminal may be a mobile phone, a tablet computer, a smart watch, or the like.

In the step S12, at least one of an output voltage or an output frequency of the wireless AC power signal is adjusted according to the power adjustment value to adjust an output power of the wireless AC power signal.

According to the control method for a wireless charging apparatus provided by the embodiments of the present disclosure, the power adjustment value transmitted by the terminal is received, and at least one of the output voltage or the output frequency of the wireless AC power signal is adjusted according to the power adjustment value to adjust an output power of the wireless AC power signal. The method can ensure wireless charging efficiency for the terminal while meeting changes in battery load power demands of the terminal, avoid the occurrence of serious heating of the terminal in high-power charging process, and has a wide application range.

In some embodiments, the terminal may determine the power adjustment value through an output voltage of its own rectifying circuit. The terminal may couple the power adjustment value to the wireless charging apparatus through an ASK modulation signal, and the wireless charging apparatus demodulates the ASK modulation signal to obtain the power adjustment value.

In some embodiments, the power adjustment value may be expressed by Equation 1, $$CEP_{value} = \frac{V_{target} - V_{rect}}{V_{target}} \times a \qquad \text{Equation 1}$$

wherein, $CEP_{value}$ is the power adjustment value, $V_{target}$ is the target voltage of the wireless AC power signal received by the terminal, $V_{rect}$ is the real voltage of the wireless AC power signal received by the terminal, and a is an adjustment coefficient.

A value of the adjustment coefficient a is set according to a charging demand of the terminal, an adjustment capability of the wireless charging apparatus, and the like. For example, a may be set as 128, which is not limited by the present disclosure.

In the implementation, the target voltage of the wireless AC power signal received by the terminal may be determined according to information such as a type, a nominal capacity, and a limiting voltage of the battery in the terminal. Moreover, since the voltages required for the battery during different charging stages (including trickle charging, constant current charging, constant voltage charging, and termination of charging) are not exactly the same, different target voltages may be set for different charging stages of the battery. For example, in the constant voltage charging stage of the battery, the target voltage is set as 4.2v; and in the trickle charging stage of the battery, the target voltage is set as 3v. Those skilled in the art may set the target voltage according to actual needs, which is not limited in the present disclosure.

In the implementation, an absolute value of the power adjustment value may characterize a degree to which the output power of the wireless AC power signal needs to be adjusted. The greater the absolute value of the power adjustment value is, the greater the difference between the real voltage and the target voltage is, and the greater the degree to which the output power of the wireless AC power signal needs to be adjusted is. The smaller the absolute value of the power adjustment value is, the smaller the difference between the real voltage and the target voltage is, and the smaller the degree to which the output power of the wireless AC power signal needs to be adjusted is.

In some embodiments, the power adjustment value transmitted by the terminal may be transmitted by using a Control Error Packet (CEP). In the CEP, the power adjustment value may be represented by 8 Bits, wherein Bits 6 to 0 may be used to indicate a specific value of the power adjustment value, and Bit 7 may be used to indicate positive or negative of the power adjustment value.

Figure 3:
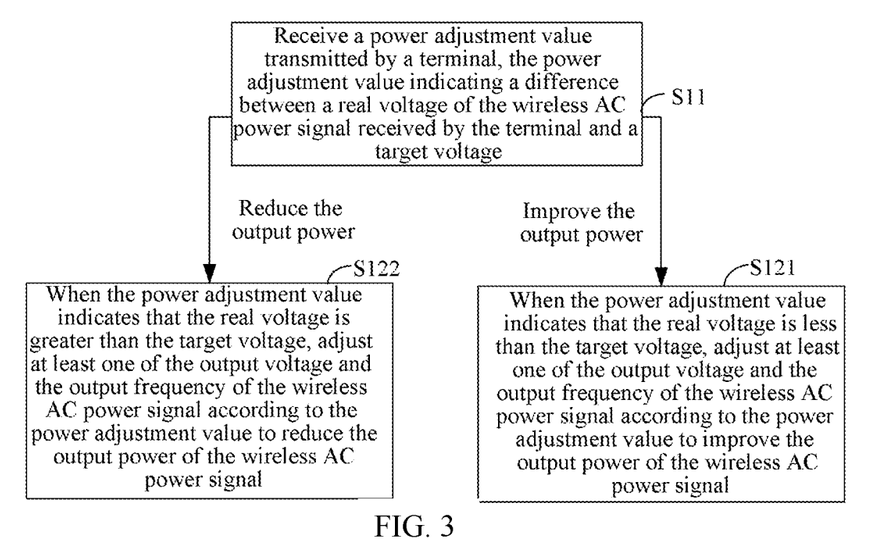
FIG. 3 is a flowchart of a control method for a wireless charging apparatus according to an exemplary embodiment.

In some embodiments, in the step S12, a magnitude relation between the real voltage of the wireless AC power signal received by the terminal and a preset target voltage required by the terminal to receive the wireless AC power signal may be determined according to the power adjustment value, and then the output power of the wireless AC power signal may be improved or reduced according to the magnitude relation between the real voltage and the target voltage. FIG. 3 is a flowchart of a control method for a wireless charging apparatus according to an exemplary embodiment. As shown in FIG. 3, the step S12 may include a step S121 and a step S122.

In the step S121, when the power adjustment value indicates that the real voltage is less than the target voltage, at least one of the output voltage or the output frequency of the wireless AC power signal is adjusted according to the power adjustment value to improve the output power of the wireless AC power signal.

In the step S122, when the power adjustment value indicates that the real voltage is greater than the target voltage, at least one of the output voltage or the output frequency of the wireless AC power signal is adjusted according to the power adjustment value to reduce the output power of the wireless AC power signal.

When the power adjustment value indicates that the real voltage is equal to the target voltage, the output power of the wireless AC power signal may not be adjusted.

In some embodiments, if the power adjustment value is expressed by Equation 1, when the power adjustment value is greater than zero, it may be determined that the real voltage is less than the target voltage; and when the power adjustment value is less than zero, it may be determined that the real voltage is greater than the target voltage.

In some embodiments, the step S12 may include at least one of the followings.

In a situation that the power adjustment value indicates that the real voltage is less than the target voltage, and the output voltage of the wireless AC power signal is less than a voltage limit, the output voltage of the wireless AC power signal is improved to improve the output power of the wireless AC power signal.

In a situation that the power adjustment value indicates that the real voltage is less than the target voltage, and the output voltage of the wireless AC power signal is equal to the voltage limit, the output frequency of the wireless AC power signal is reduced to improve the output power of the wireless AC power signal.

In a situation that the power adjustment value indicates that the real voltage is greater than the target voltage, and the output frequency of the wireless AC power signal is less than a frequency limit, the output frequency of the wireless AC power signal is improved to reduce the output power of the wireless AC power signal.

In a situation that the power adjustment value indicates that the real voltage is greater than the target voltage, and the output frequency of the wireless AC power signal is equal to the frequency limit, the output frequency of the wireless AC power signal is reduced to reduce the output power of the wireless AC power signal.

In the implementation, when it is determined that the output power of the wireless AC power signal needs to be improved, the output voltage of the wireless AC power signal may be first improved. If the output power of the wireless AC power signal still needs to be improved after the output voltage is improved to the voltage limit, the output power of the wireless AC power signal may be continuously improved by reducing the output frequency of the wireless AC power signal. In this way, the wireless charging efficiency can be kept in an optimal state while the battery load power demand is met from less to more and the output power of the wireless AC power signal needs to be improved.

In the implementation, when it is determined that the output power of the wireless AC power signal needs to be reduced, the output frequency of the wireless AC power signal may be first improved. If the output power of the wireless AC power signal still needs to be reduced after the output frequency is improved to the frequency limit, the output power of the wireless AC power signal may be continuously reduced by reducing the output voltage of the wireless AC power signal.

Through the above mode, the output power of the wireless AC power signal is changed by the combination manner of adjusting the output voltage and the output frequency of the wireless AC power signal, which satisfies the power change demand of the wireless AC power signal required by the terminal, and ensures that the charging efficiency in the wireless charging process for the terminal is always in an optimal state.

In some embodiments, a corresponding relation between the magnitude of the power adjustment value and the adjustment of the output voltage and the output frequency may be determined in advance. Further, after receiving the power adjustment value, an amplitude of the output voltage or an amplitude of the output frequency to be adjusted is determined according to the magnitude of the power adjustment value and the corresponding relation determined.

In the implementation, different magnitude ranges of the power adjustment value may be set, and different ranges of values correspond to different amplitudes of output voltages or ranges of output frequencies. For example, it is set that the output voltage may be improved or reduced by 20 mv, or the output frequency may be improved or reduced by 20 Hz when $|CEP_{value}| \in (U_1, U_2)$. The output voltage may be improved or reduced by 30 mv, or the output frequency may be improved or reduced by 30 Hz when $|CEP_{value}| \in (U_2, U_3)$. Those skilled in the art may set the required changes in the amplitudes of the output voltage and the output frequency according to actual needs, which is not limited in the present disclosure.

In the implementation, the magnitudes of the output voltage and the output frequency corresponding to the magnitude of the power adjustment value may also be determined according to the magnitude of the power adjustment value, and then the output power of the wireless AC power signal may be adjusted according to the magnitudes determined.

Figure 4:
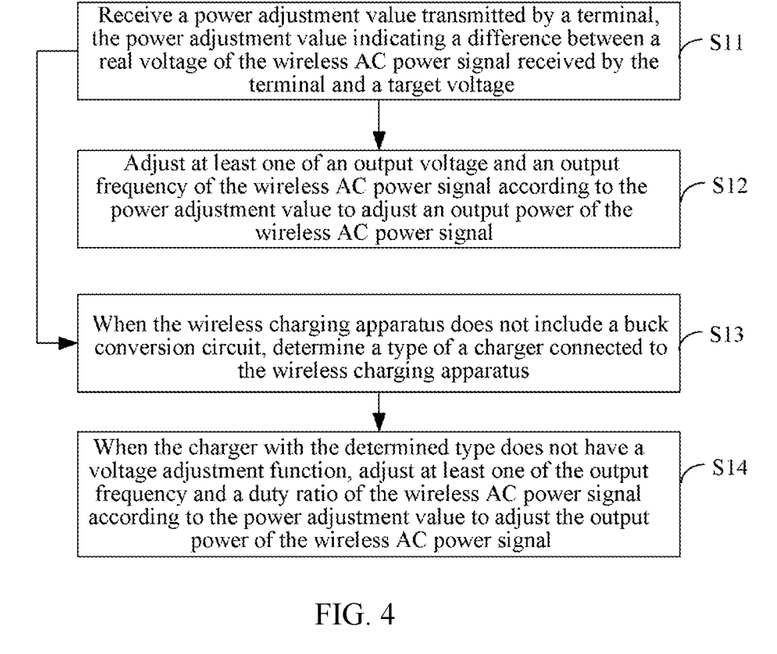
FIG. 4 is a flowchart of a control method for a wireless charging apparatus according to an exemplary embodiment.

FIG. 4 is a flowchart of a control method for a wireless charging apparatus according to an exemplary embodiment. In some embodiments, as shown in FIG. 4, the method may further include a step S13 and a step S14.

In the step S13, when the wireless charging apparatus does not include a buck converter circuit (also known as BUCK circuit), a type of a charger connected to the wireless charging apparatus is determined.

In the implementation, the charger may include a charger capable of providing a DC power signal to the wireless charging apparatus, such as a DCP charger, a QC2.0 charger, a QC3.0 charger, a QC4.0 charger, and a PD charger. The PD charger, the QC3.0 charger and the QC4.0 charger have a voltage adjustment function. The DCP charger and the QC2.0 charger do not have a voltage adjustment function.

In the step S14, when the charger with the determined type does not have a voltage adjustment function, at least one of the output frequency or a duty ratio of the wireless AC power signal is adjusted according to the power adjustment value to adjust the output power of the wireless AC power signal.

In the implementation, if the charger is a DCP charger or a QC2.0 charger, since the two do not have a voltage adjustment function, the output power of the wireless AC power signal may be adjusted by adjusting the output frequency and/or duty ratio for the two types of chargers. When determining that the output power of the wireless AC power signal needs to be reduced according to the power adjustment value, the output frequency of the wireless AC power signal may be first improved. If the output power of the wireless AC power signal still needs to be reduced after the output frequency has already improved to the frequency limit, the output power of the wireless AC power signal may be continuously reduced by reducing the duty ratio. If determining that the output power of the wireless AC power signal needs to be improved according to the power adjustment value, the output frequency of the wireless AC power signal may be reduced, or the duty ratio of the wireless AC power signal may be improved.

In some embodiments, when the wireless charging apparatus includes a buck converter circuit, e.g., DC-to-DC Step-Down circuit, the type of the charger connected to the wireless charging apparatus may not be identified, and the output power of the wireless AC power signal may be adjusted by directly using the method of adjusting the output power in the step S12.

In some embodiments, when the wireless charging apparatus does not include a buck converter circuit, and the charger connected to the wireless charging apparatus has a voltage adjustment function, the output power of the wireless AC power signal may be adjusted by using the method of adjusting the output power in the step S12 similarly.

In this way, regardless of whether the connected charger has a voltage adjustment function, the method provided by the present disclosure can adjust the output power of the wireless AC power signal transmitted by the wireless charging apparatus, and has a wide application range.

It should be noted that although the examples of the control method for a wireless charging apparatus are described with the above embodiment as an example, those skilled in the art can understand that the present disclosure should not be limited thereto. In fact, the user may flexibly set the steps according to personal preference and/or actual application scenarios, as long as the technical solutions of the present disclosure are satisfied.

Figure 5:
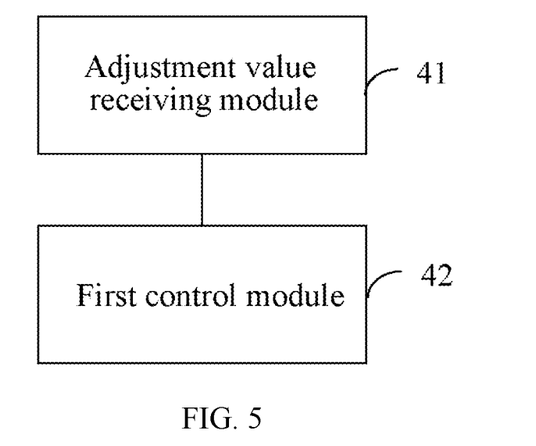
FIG. 5 is a block diagram of a control device for a wireless charging apparatus according to an exemplary embodiment.

FIG. 5 is a block diagram of a control device for a wireless charging apparatus according to an exemplary embodiment. The control device for a wireless charging apparatus is applied to a wireless charging apparatus that converts a DC power signal provided by a charger into a wireless AC power signal to wirelessly charge the terminal. As shown in FIG. 5, the control device for a wireless charging apparatus includes an adjustment value receiving module 41 and a first control module 42. The adjustment value receiving module 41 is configured to receive a power adjustment value transmitted by a terminal, the power adjustment value indicating a difference between a real voltage of the wireless AC power signal received by the terminal and a target voltage. The first control module 42 is configured to adjust at least one of the output voltage or the output frequency of the wireless AC power signal according to the power adjustment value to adjust the output power of the wireless AC power signal.

Figure 6:
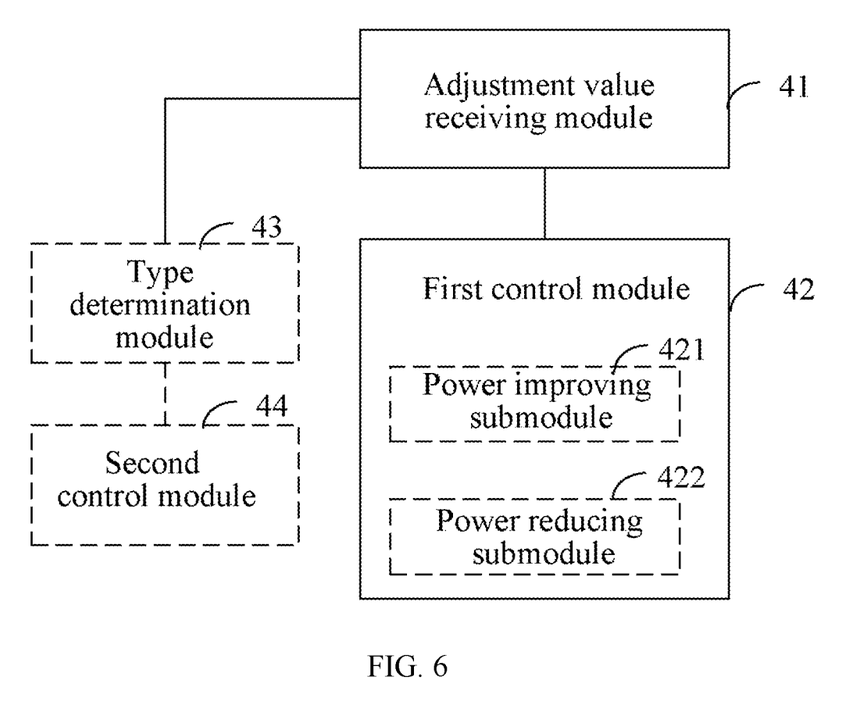
FIG. 6 is a block diagram of a control device for a wireless charging apparatus according to an exemplary embodiment.

FIG. 6 is a block diagram of a control device for a wireless charging apparatus according to an exemplary embodiment. In some embodiments, as shown in FIG. 6, the first control module 42 may include a power improving submodule 421 and a power reducing submodule 422. The power improving submodule 421 is configured to, when the power adjustment value indicates that the real voltage is less than the target voltage, adjust at least one of the output voltage or the output frequency of the wireless AC power signal according to the power adjustment value to improve the output power of the wireless AC power signal. The power reducing submodule 422 is configured to, when the power adjustment value indicates that the real voltage is greater than the target voltage, adjust at least one of the output voltage or the output frequency of the wireless AC power signal according to the power adjustment value to reduce the output power of the wireless AC power signal.

In some embodiments, the first control module 42 may include at least one of the following submodules: a voltage improving submodule, a frequency reducing submodule, a frequency improving submodule and a voltage reducing submodule. The various modules, portions, units, or components may be realized with hardware, software, or a combination thereof.

The voltage improving submodule is configured to, when the power adjustment value indicates that the real voltage is less than the target voltage and the output voltage of the wireless AC power signal is less than a voltage limit, improve the output voltage of the wireless AC power signal. The frequency reducing submodule is configured to, when the power adjustment value indicates that the real voltage is less than the target voltage and the output voltage of the wireless AC power signal is equal to the voltage limit, reduce the output frequency of the wireless AC power signal. The frequency improving submodule is configured to, when the power adjustment value indicates that the real voltage is greater than the target voltage and the output frequency of the wireless AC power signal is less than a frequency limit, improve the output frequency of the wireless AC power signal. The voltage reducing submodule is configured to, when the power adjustment value indicates that the real voltage is greater than the target voltage and the output frequency of the wireless AC power signal is equal to the frequency limit, reduce the output voltage of the wireless AC power signal.

In some embodiments, the power adjustment value may be expressed by Equation 1, $$CEP_{value} = \frac{V_{target} - V_{rect}}{V_{target}} \times a \qquad \text{Equation 1}$$

wherein $CEP_{value}$ is the power adjustment value, $V_{target}$ is the target voltage of the wireless AC power signal received by the terminal, $V_{rect}$ is the real voltage of the wireless AC power signal received by the terminal, and a is an adjustment coefficient.

In some embodiments, as shown in FIG. 6, the device may further include a type determination module 43 and a second control module 44. The type determination module 43 is configured to, when the wireless charging apparatus does not include a buck converter circuit, determine a type of a charger connected to the wireless charging apparatus. The second control module 44 is configured to, when the charger with the determined type does not have a voltage adjustment function, adjust at least one of the output frequency or a duty ratio of the wireless AC power signal according to the power adjustment value to adjust the output power of the wireless AC power signal.

The control device for a wireless charging apparatus provided by the embodiments of the present disclosure can ensure wireless charging efficiency for the terminal while meeting changes in battery load power demands of the terminal, avoid the occurrence of serious heating of the terminal in high-power charging process, and has a wide application range.

Various embodiments of the present disclosure can have one or more of the following advantages: the control method and control device for a wireless charging apparatus and the wireless charging apparatus provided by the embodiments of the present disclosure can ensure wireless charging efficiency for the terminal while meeting changes in battery load power demands of the terminal, avoid the occurrence of serious heating of the terminal in high-power charging process, and has a wide application range.

It should be noted that although the examples of the control device for a wireless charging apparatus is described with the above embodiment as an example, those skilled in the art may understand that the present disclosure should not be limited thereto. In fact, the user may flexibly set the modules according to personal preference and/or actual application scenarios, as long as the technical solutions of the present disclosure are satisfied.

The embodiments of the present disclosure further provide a wireless charging apparatus which includes the control device for a wireless charging apparatus above.

In some embodiments, the various modules may be implemented by one or more application specific integrated circuits (ASIC), digital signal processors (DSPs), digital signal processing devices (DSPDs), programmable logic devices (PLDs), field programmable gate arrays (FPGAs), controllers, microcontrollers, microprocessors or other electronic components by performing the above methods.

In some embodiments, a non-transitory computer-readable storage medium including instructions can be provided, such as a memory device including instructions to realize the control method described above. The instructions may be executed by a processing circuit or processor so as to accomplish the above method. For example, the non-transitory computer-readable storage medium may a static random access memory (SRAM), an electrically erasable programmable read only memory (EEPROM), an erasable programmable read-only memory (EPROM), a programmable read-only memory (PROM), a read-only memory (ROM), a magnetic memory, a flash memory, a magnetic or optical disc, etc.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized. Some other embodiments of the present disclosure can be available to those skilled in the art upon consideration of the specification and practice of the various embodiments disclosed herein.

The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims. In the present disclosure, it is to be understood that the terms "bottom," "inside," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "some embodiments," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A control method for a wireless charging apparatus, applied to the wireless charging apparatus that is configured to convert a Direct Current (DC) power signal provided by a charger into a wireless Alternating Current (AC) power signal to wirelessly charge a terminal, the method comprising:
receiving a power adjustment value transmitted by the terminal, the power adjustment value indicating any one of a difference between a real voltage of the wireless AC power signal received by the terminal and a target voltage, a charging demand of the terminal, an adjustment capability of the wireless charging apparatus; and
adjusting an output voltage or an output frequency of the wireless AC power signal according to the power adjustment value to adjust an output power of the wireless AC power signal,
wherein the adjusting comprises:
in response to determining that the output voltage is increased to a voltage limit, reducing the output frequency to increase the output power; and
in response to determining that the output frequency is increased to a frequency limit, reducing the output voltage to reduce the output power
wherein the adjusting the output voltage or the output frequency of the wireless AC power signal according to the power adjustment value to adjust the output power of the wireless AC power signal comprises:
upon the power adjustment value indicating that the real voltage is less than the target voltage, adjusting at least one of the output voltage or the output frequency of the wireless AC power signal according to the power adjustment value to improve the output power of the wireless AC power signal; and
upon the power adjustment value indicating that the real voltage is greater than the target voltage, adjusting at least one of the output voltage or the output frequency of the wireless AC power signal according to the power adjustment value to reduce the output power of the wireless AC power signal, wherein the adjusting the output voltage or the output frequency of the wireless AC power signal according to the power adjustment value comprises at least one of:
upon the power adjustment value indicating that the real voltage is less than the target voltage, and the output voltage of the wireless AC power signal is less than the voltage limit, improving the output voltage of the wireless AC power signal;
upon the power adjustment value indicating that the real voltage is less than the target voltage, and the output voltage of the wireless AC power signal is equal to the voltage limit, reducing the output frequency of the wireless AC power signal;
upon the power adjustment value indicating that the real voltage is greater than the target voltage, and the output frequency of the wireless AC power signal is less than the frequency limit, improving the output frequency of the wireless AC power signal; and
upon the power adjustment value indicating that the real voltage is greater than the target voltage, and the output frequency of the wireless AC power signal is equal to the frequency limit, reducing the output voltage of the wireless AC power signal.

2. The method according to claim 1, wherein the adjusting at least one of the output voltage or the output frequency of the wireless AC power signal according to the power adjustment value comprises at least one of:
upon the power adjustment value indicating that the real voltage is less than the target voltage, and the output voltage of the wireless AC power signal is less than the voltage limit, improving the output voltage of the wireless AC power signal;
upon the power adjustment value indicating that the real voltage is less than the target voltage, and the output voltage of the wireless AC power signal is equal to the voltage limit, reducing the output frequency of the wireless AC power signal;
upon the power adjustment value indicating that the real voltage is greater than the target voltage, and the output frequency of the wireless AC power signal is less thana the frequency limit, improving the output frequency of the wireless AC power signal; or
upon the power adjustment value indicating that the real voltage is greater than the target voltage, and the output frequency of the wireless AC power signal is equal to the frequency limit, reducing the output voltage of the wireless AC power signal.

3. The method according to claim 1, wherein the power adjustment value is represented by Equation 1, $$CEP_{value} = \frac{V_{target} - V_{rect}}{V_{target}} \times a \qquad \text{Equation 1}$$

wherein $CEP_{value}$ is the power adjustment value, $V_{target}$ is the target voltage of the wireless AC power signal received by the terminal, $V_{rect}$ is the real voltage of the wireless AC power signal received by the terminal, and a is an adjustment coefficient.

4. The method according to claim 2, wherein the power adjustment value is represented by Equation 1, $$CEP_{value} = \frac{V_{target} - V_{rect}}{V_{target}} \times a \qquad \text{Equation 1}$$

wherein $CEP_{value}$ is the power adjustment value, $V_{target}$ is the target voltage of the wireless AC power signal received by the terminal, $V_{rect}$ is the real voltage of the wireless AC power signal received by the terminal, and a is an adjustment coefficient.

5. The method according to claim 1, further comprising:
in a case that the wireless charging apparatus does not comprise a buck converter circuit, determining a type of the charger connected to the wireless charging apparatus; and
in a case that the charger with the determined type does not have a voltage adjustment function, adjusting at least one of the output frequency or a duty ratio of the wireless AC power signal according to the power adjustment value to adjust the output power of the wireless AC power signal.

6. The method according to claim 1, further comprising:
in a case that the wireless charging apparatus does not comprise a buck converter circuit, determining a type of a charger connected to the wireless charging apparatus; and
in a case that the charger with the determined type does not have a voltage adjustment function, adjusting at least one of the output frequency or a duty ratio of the wireless AC power signal according to the power adjustment value to adjust the output power of the wireless AC power signal.

7. A control device for a wireless charging apparatus, applied to a wireless charging apparatus that is configured to convert a Direct Current (DC) power signal provided by a charger into a wireless Alternating Current (AC) power signal to wirelessly charge a terminal, the device comprising:
a processor; and
a memory for storing instructions executable by the processor;
wherein the processor is configured to:
receive a power adjustment value transmitted by the terminal, the power adjustment value indicating any one of a difference between a real voltage of the wireless AC power signal received by the terminal and a target voltage, a charging demand of the terminal, an adjustment capability of the wireless charging apparatus; and
adjust an output voltage or an output frequency of the wireless AC power signal according to the power adjustment value to adjust an output power of the wireless AC power signal,
wherein the adjust comprises:
in response to determining that the output voltage is increased to a voltage limit, reduce the output frequency to increase the output power; and
in response to determining that the output frequency is increased to a frequency limit, reduce the output voltage to reduce the output power
wherein the processor is further configured to:
when the power adjustment value indicates that the real voltage is less than the target voltage, adjust at least one of the output voltage or the output frequency of the wireless AC power signal according to the power adjustment value to improve the output power of the wireless AC power signal; and
when the power adjustment value indicates that the real voltage is greater than the target voltage, adjust at least one of the output voltage or the output frequency of the wireless AC power signal according to the power adjustment value to reduce the output power of the wireless AC power signal,
wherein the processor is further configured to:
when the power adjustment value indicates that the real voltage is less than the target voltage, and the output voltage of the wireless AC power signal is less than the voltage limit, improve the output voltage of the wireless AC power signal;
when the power adjustment value indicates that the real voltage is less than the target voltage, and the output voltage of the wireless AC power signal is equal to the voltage limit, reduce the output frequency of the wireless AC power signal;
when the power adjustment value indicates that the real voltage is greater than the target voltage, and the output frequency of the wireless AC power signal is less than the frequency limit, improve the output frequency of the wireless AC power signal; and
when the power adjustment value indicates that the real voltage is greater than the target voltage, and the output frequency of the wireless AC power signal is equal to the frequency limit, reduce the output voltage of the wireless AC power signal.

8. The device according to claim 7, wherein the processor is further configured to:
when the power adjustment value indicates that the real voltage is less than the target voltage, and the output voltage of the wireless AC power signal is less than the voltage limit, improve the output voltage of the wireless AC power signal;
when the power adjustment value indicates that the real voltage is less than the target voltage, and the output voltage of the wireless AC power signal is equal to the voltage limit, reduce the output frequency of the wireless AC power signal;
when the power adjustment value indicates that the real voltage is greater than the target voltage, and the output frequency of the wireless AC power signal is less than the frequency limit, improve the output frequency of the wireless AC power signal; and
when the power adjustment value indicates that the real voltage is greater than the target voltage, and the output frequency of the wireless AC power signal is equal to the frequency limit, reduce the output voltage of the wireless AC power signal.

9. The device according to claim 7, wherein the power adjustment value is represented by Equation 1, $$CEP_{value} = \frac{V_{target} - V_{rect}}{V_{target}} \times a \qquad \text{Equation 1}$$

wherein $CEP_{value}$ is the power adjustment value, $V_{target}$ is the target voltage of the wireless AC power signal received by the terminal, $V_{rect}$ is the real voltage of the wireless AC power signal received by the terminal, and a is an adjustment coefficient.

10. The device according to claim 7, wherein the power adjustment value is represented by Equation 1, $$CEP_{value} = \frac{V_{target} - V_{rect}}{V_{target}} \times a \qquad \text{Equation 1}$$

wherein $CEP_{value}$ is the power adjustment value, $V_{target}$ is the target voltage of the wireless AC power signal received by the terminal, $V_{rect}$ is the real voltage of the wireless AC power signal received by the terminal, and a is an adjustment coefficient.

11. The device according to claim 7, wherein the processor is further configured to:
   in a case that the wireless charging apparatus does not comprise a buck converter circuit, determine a type of a charger connected to the wireless charging apparatus; and
   in a case that the charger with the determined type does not have a voltage adjustment function, adjust at least one of the output frequency or a duty ratio of the wireless AC power signal according to the power adjustment value to adjust the output power of the wireless AC power signal.

12. The device according to claim 7, wherein the processor is further configured to:
   in a case that the wireless charging apparatus does not comprise a buck converter circuit, determine a type of a charger connected to the wireless charging apparatus; and
   in a case that the charger with the determined type does not have a voltage adjustment function, adjust at least one of the output frequency or a duty ratio of the wireless AC power signal according to the power adjustment value to adjust the output power of the wireless AC power signal.

13. A wireless charging apparatus, comprising a control device, the control device for a wireless charging apparatus, applied to a wireless charging apparatus that is configured to convert a Direct Current (DC) power signal provided by a charger into a wireless Alternating Current (AC) power signal to wirelessly charge a terminal, the device comprising:
   a processor; and
   a memory for storing instructions executable by the processor;
   wherein the processor is configured to:
   receive a power adjustment value transmitted by the terminal, the power adjustment value indicating any one of a difference between a real voltage of the wireless AC power signal received by the terminal and a target voltage, a charging demand of the terminal, an adjustment capability of the wireless charging apparatus; and
   adjust an output voltage or an output frequency of the wireless AC power signal according to the power adjustment value to adjust an output power of the wireless AC power signal,
   wherein the adjust comprises:
   in response to determining that the output voltage is increased to a voltage limit, reduce the output frequency to increase the output power; and
   in response to determining that the output frequency is increased to a frequency limit, reduce the output voltage to reduce the output power
   wherein the adjusting the output voltage or the output frequency of the wireless AC power signal according to the power adjustment value to adjust the output power of the wireless AC power signal comprises:

upon the power adjustment value indicating that the real voltage is less than the target voltage, adjusting at least one of the output voltage or the output frequency of the wireless AC power signal according to the power adjustment value to improve the output power of the wireless AC power signal; and
   upon the power adjustment value indicating that the real voltage is greater than the target voltage, adjusting at least one of the output voltage or the output frequency of the wireless AC power signal according to the power adjustment value to reduce the output power of the wireless AC power signal,
   wherein the adjusting the output voltage or the output frequency of the wireless AC power signal according to the power adjustment value comprises at least one of:
   upon the power adjustment value indicating that the real voltage is less than the target voltage, and the output voltage of the wireless AC power signal is less than the voltage limit, improving the output voltage of the wireless AC power signal;
   upon the power adjustment value indicating that the real voltage is less than the target voltage, and the output voltage of the wireless AC power signal is equal to the voltage limit, reducing the output frequency of the wireless AC power signal;
   upon the power adjustment value indicating that the real voltage is greater than the target voltage, and the output frequency of the wireless AC power signal is less than the frequency limit, improving the output frequency of the wireless AC power signal; and
   upon the power adjustment value indicating that the real voltage is greater than the target voltage, and the output frequency of the wireless AC power signal is equal to the frequency limit, reducing the output voltage of the wireless AC power signal.

14. The wireless charging apparatus according to claim 13, further comprising a buck converter circuit, wherein the processor is configured to control the output power of the wireless AC power signal directly.

15. The wireless charging apparatus according to claim 13, wherein the wireless charging apparatus does not include a buck converter circuit, and the processor is further configured to determine a type of a charger connected to the wireless charging apparatus.

16. The wireless charging apparatus according to claim 15, wherein the processor is further configured to, in a case that the charger with the determined type does not have a voltage adjustment function, adjust at least one of the output frequency or a duty ratio of the wireless AC power signal according to the power adjustment value to adjust the output power of the wireless AC power signal; wherein the power adjustment value is represented by Equation 1, $$CEP_{value} = \frac{V_{target} - V_{rect}}{V_{target}} \times a \qquad \text{Equation 1}$$

wherein $CEP_{value}$ is the power adjustment value, $V_{target}$ is the target voltage of the wireless AC power signal received by the terminal, $V_{rect}$ is the real voltage of the wireless AC power signal received by the terminal, and a is an adjustment coefficient.

* * * * *